United States Patent [19]

Uchida

[11] E Re. 28,579

[45] Reissued Oct. 21, 1975

[54] INTEGRATING NETWORK USING AT LEAST ONE D-C AMPLIFIER

[75] Inventor: Kozo Uchida, Tokyo, Japan

[73] Assignee: Iwasaki Tsushinki Kabushiki Kaisha, Japan

[22] Filed: May 30, 1974

[21] Appl. No.: 474,806

Related U.S. Patent Documents

Reissue of:

[64] Patent No.: 3,667,055
Issued: May 30, 1972
Appl. No.: 49,294
Filed: June 24, 1970

[30] Foreign Application Priority Data

| | | |
|---|---|---|
| June 28, 1969 | Japan | 44-51173 |
| June 28, 1969 | Japan | 44-51174 |
| May 13, 1970 | Japan | 45-40037 |
| May 13, 1970 | Japan | 45-40038 |
| May 13, 1970 | Japan | 45-40039 |
| May 13, 1970 | Japan | 45-40040 |

[52] U.S. Cl. ..... 328/127; 307/229; 307/238; 330/9

[51] Int. Cl.[2] ..... H03K 5/00

[58] Field of Search .... 307/297, 229, 238; 328/127, 328/128; 330/9; 235/183

[56] References Cited

UNITED STATES PATENTS

| | | | |
|---|---|---|---|
| 3,070,786 | 12/1962 | MacIntyre | 307/297 |
| 3,072,856 | 1/1963 | Close | 328/127 |
| 3,147,446 | 9/1964 | Wittenberg | 330/9 |
| 3,167,718 | 1/1965 | Davis et al. | 307/229 |
| 3,246,171 | 4/1966 | White | 307/229 |
| 3,382,461 | 5/1968 | Wolcott | 330/9 |
| 3,541,320 | 11/1970 | Beall | 330/9 |

OTHER PUBLICATIONS

Automatic Drift Compensation in D.C. Amplifier, by Cederbaum, et. al., pp. 745–747, Rev. of Sci. Inst., August, 1955, Vol. 26, No. 8.

*Primary Examiner*—Michael J. Lynch
*Assistant Examiner*—B. P. Davis
*Attorney, Agent, or Firm*—Robert E. Burns; Emmanuel J. Lobato; Bruce L. Adams

[57] ABSTRACT

An integrating network for performing integration of an input voltage by the use of an integrator comprising time-constant means and a d-c amplifier, wherein a drift memory circuit is provided between the output and input of the integrator for feeding back [ in the opposite polarity ] *from* the output of the d-c amplifier to [ the ] *an* input *terminal* of the integrator, *a feedback signal of polarity in opposition to the input voltage* in a case of no input of the d-c amplifier so as to obtain a stationary condition and for continuously sending out, as a feedback signal, a voltage fed back to the input of the integrator at the stationary condition, the feedback signal having a value substantially equal to the drift voltage of the d-c amplifier converted in terms of the input of the d-c amplifier, whereby an input voltage is integrated in the integrating network without error caused by the drift of the d-c amplifier.

21 Claims, 16 Drawing Figures

INTEGRATING NETWORK USING AT LEAST ONE D-C AMPLIFIER

Matter enclosed in heavy brackets [ ] appears in the original patent but forms no part of this reissue specification; matter printed in italics indicates the additions made by reissue.

---

This invention relates to integrating networks having an output waveform corresponding to the time integral of its input waveform and more particularly to integrating [network] networks using at least one direct-current amplifier.

In conventional integrating networks for obtaining an integrated value corresponding to the time integral of the input signal, a d-c amplifier is usually used. In this case, stability and no-drift are required of the d-c amplifier since an integrating error is caused by the drift. To reduce the value of the drift, chopper amplifiers are frequently used. However, the drift is still appreciable in the chopper amplifier, so that the value of drift is a main factor for determining the preciseness of integration. The above-mentioned drift can be eliminated by drift-compensation which is manually carried out for zero adjustment. However, it is very troublesome to perform such manual adjustment at every integration. Moreover, it is very difficult to always obtain correct results by [the] manual adjustment.

An object of this invention is to provide integrating networks capable of eliminating the above-mentioned defects of the conventional art and capable of readily performing zero adjustment with certainty.

Another object of this invention is to provide integrating networks suitable for highly reliable analogue-digital converters.

In accordance with the feature of this invention, there is proposed an integrating network for performing integration of an input voltage by the use of an integrator comprising time-constant means and a d-c amplifier, characterized in that a drift memory circuit is provided between the output and input of the integrator for feeding back [in the opposite polarity] *from* the output of the d-c amplifier to [the] *an* input *terminal* of the integrator, in a case of no input of the d-c amplifier, *a feedback signal of polarity in opposition to the input voltage* so as to obtain a stationary condition, and for continuously sending out, as a feedback signal, a voltage fed back to the input of the integrator at the stationary condition, the feedback signal having a value substantially equal to the drift voltage of the d-c amplifier, whereby an input voltage is integrated in the integrating network without error caused by the drift of the d-c amplifier.

The principle, construction, operation and merits of this invention will be better understood from the following more detailed discussion in conjunction with the accompanying drawings, in which similar parts are designated by the similar reference numerals, characters and symbols, and in which.

Figure 1:
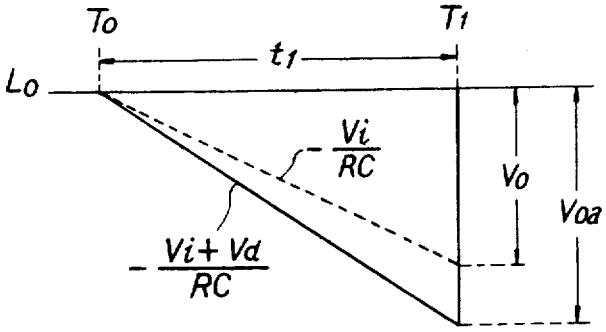
FIG. 1 is a waveform diagram explanatory of drift in a d-c amplifier used in this invention.

With reference to FIG. 1, the concept of how an integration error is caused by the drift in a d-c amplifier used in an integrator is at first described. If it is assumed that the voltage of an input signal and the time constant of an integrator are values $V_i$ and RC respectively, an output waveform $V_o$ having the gradient $(-V_i/RC)$ is obtained at the output of the integrator in response to the voltage $V_i$ of the input signal applied if the d-c amplifier employed in the integrator has no drift. In this case, the output waveform $V_o$ would reach a voltage $V_{o1}$ equal to a value $(-V_i.t/RC)$ at a time $T_1$ delayed by a time $t_1$ after a time $T_0$ when the output waveform $V_o$ exceeds a predetermined reference level (e.g.; zero level Lo).

However, if the d-c amplifier drifts, the output waveform $V_o$ would reach a value $(-Vd.t_1/RC)$ at the time $T_1$ even if the voltage $V_i$ of the input signal is zero; where the value "Vd" is a value of drift converted in terms of the input of the integrator. Accordingly, if the input voltage $V_i$ of the input signal is applied to the integrator having the drift Vd, the output waveform $V_o$ has the gradient $-(Vi + Vd)/RC$ and reaches a value $Voa = -(V_i + Vd)t_1/RC$ at the time $T_1$ delayed by the time $t_1$ after the time $T_0$ when the output waveform $V_o$ exceeds the zero level Lo. In other words, an error [(Voa− Vo)] *(Voa−Vol)* equal to a value $-Vd.t_1/RC$ is a result of the drift Vd.

As mentioned above, drift is a main factor of error in the conventional integrating network. To reduce the error to a minimum, an amplifier (e.g.; chopper amplifier) having only a small drift has been employed. However even with such a provision, the elimination of errors is not sufficient while the cost of the integrating network is relatively high.

In accordance with the principle of this invention, a compensating voltage −Vd is continuously applied to the input of the integrator in addition to the input voltage Vi of the input signal before every integration if the value of drift converted in terms of the input of the integrator is a value Vd. As a result of this feature of this invention, the drift can be effectively eliminated without use of an expensive chopper amplifier to provide a reliable integrator of low cost.

Figure 2:
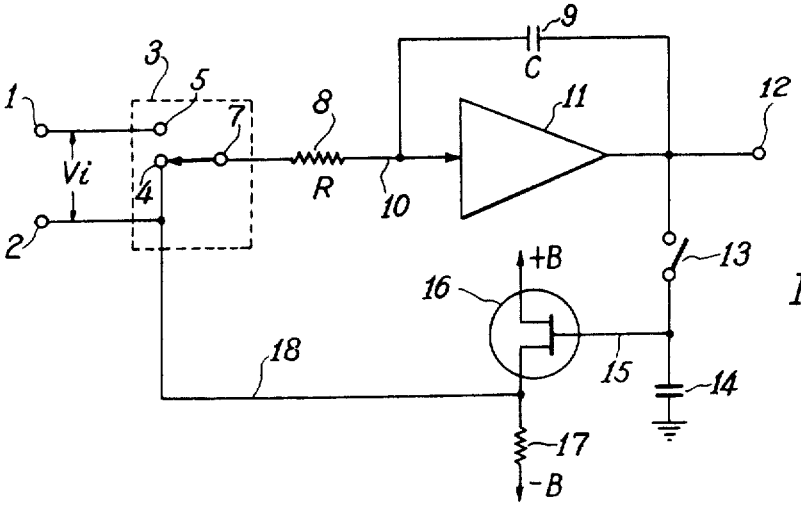
FIG. 2 is a block diagram illustrating an embodiment of this invention.

With reference to FIG. 2, an embodiment of this invention comprises input terminals 1 and 2 for applying an input signal to be integrated, a switch 3 connected between a common terminal 7 and one of two terminals 4 and 5, an integrating register 8, an integrating capacitor 9, a d-c amplifier 11 having a sufficient gain and producing an output whose polarity is reverse to the polarity of the input signal applied to the input 10 of the amplifier 11, an output terminal 12, a switch 13, a capacitor 14, a field-effect transistor 16 having a gate 15, a resistor 17 applying a necessary voltage between the drain and source of the field effect transistor 16 from d-c power terminals +B and −B, and a connection line 18 connecting the source of the field-effect transistor 16 to the terminal 4 of the switch 3. The integrating resistor 8, the integrating capacitor 9 and the d-c amplifier 11 form an integrator. The capacitor 14, the field effect transistor 16 and the resistor 17 forms a drift memory circuit as understood from the following description.

In this embodiment shown in FIG. 2, if it is assumed that a value of drift converted in terms of the input of the integrator is a value Vd, this converted drift is equivalently applied across the common terminal 7 and the ground potential. In this case, if the common terminal 7 of the switch 3 is connected to the terminal 4 so as to make the input signal $V_i$ zero at the common terminal 7, a current Vd/R flows through the resistor 8 having a resistance R so that the capacitor 9 (having a capacitance C) is charged. The output wave form $V_o$ obtained at the output terminal 12 is a linear wave form having the gradient −Vd/RC. Therefore, when this integrating network attains a stationary condition after connection between the terminals 4 and 7 and switch-in of the switch 13, respective potentials of the input 10 of the amplifier 11 and the connection line 18 are equal to each other so that no current flows in the resistor 8. In this case, the potential to ground of the connection 14 is a voltage which causes the potential −Vd to the ground of the connection line 18.

In this connection, after the switch 13 is switched-off and the terminals 5 and 7 are connected to each other, the input signal $V_i$ is applied across the terminals 1 and 2. Since the potential to ground of the input terminal 2 is a value −Vd due to the charged voltage of the capacitor 14, a current i which is obtained by dividing, by the resistance R of the resister 8, the sum of the potential to ground −Vd of the terminal 2, the value of drift Vd converted in terms of the input terminal and the input signal Vi flows through the resister 8. Namely:

$$i = (-Vd + Vi + Vd)/R = Vi/R \quad (1)$$

Accordingly, a linear waveform having the gradient −Vi/RC is obtained at the output terminal 12 as an output voltage Vo. At a time $T_i$ delayed by a time $t_1$ from a time $T_o$ when the output voltage Vo exceeds the zero level Lo, the output voltage Vo reaches a value $-Vi.t_1/RC$.

As mentioned above, a highly reliable integrator can be provided by detecting the drift Vd converted in terms of the input terminal before the performance of integration and by compensating the drift of the integrator by the use of the detected drift value.

If a chopper amplifier etc. having a limited small drift is employed as the d-c amplifier 11, the preciseness of integration of the integrator raises further. The switches 3 and 13 may be formed by a desired type, such as mechanical switch or electronic switch.

In order to reduce [a] *the* detecting-and storing time necessary to detect and store the drift value after connection between the terminals 4 and 7 at the switch 3, namely [a] *the* time necessary to reach [the] *a* stationary condition in a loop (terminals 4 and 7 —the resistor 8 —the amplifier 11 —the switch 13 —the field-effect transistor 16), the integrating capacitor 9 may be disconnected from the input or output of the amplifier 11 at the detecting-and-storing time.

In the embodiment shown in FIG. 2, the field-effect transistor 16 is connected as a source follower. However, this source follower may be replaced by an amplifier or an attenuator. Moreover, an amplifier or an attenuator may be inserted between the output of the d-c amplifier 11 and the output terminal 12. These embodiments will be successively described below in detail.

Figure 3:
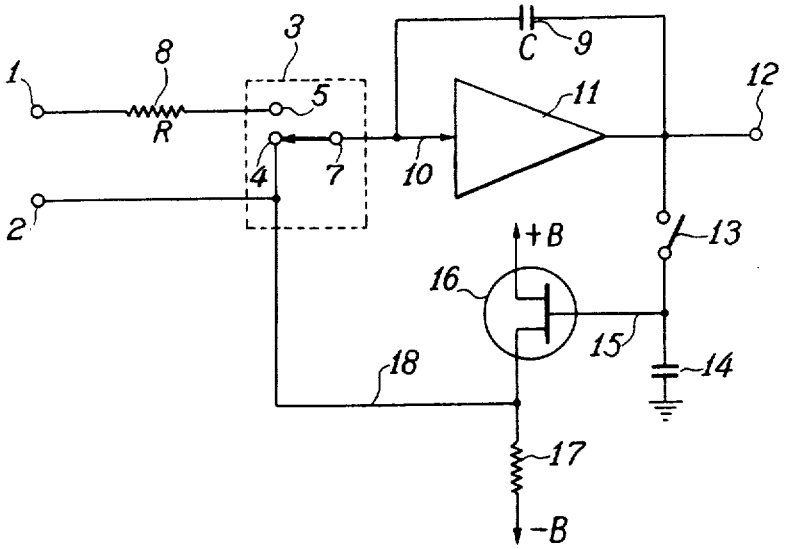
FIG. 3 is a block diagram illustrating a modification of the embodiment shown in FIG. 2.

The switch 3 may be inserted between the integrating resistor 8 and the input 10 of the d-c amplifier 11 as shown in FIG. 3. In this embodiment, operations similar to the embodiment shown in FIG. 2 can be performed.

In these embodiments, if necessary a resistance may be inserted in the connection line 18.

As mentioned above, the sum (Vi − Vd) of the input signal Vi and the output (−Vd) of the drift memory circuit is applied during the time $t_1$ to the input of the integrator so that the drift Vd is compensated. Accordingly, if the stability of the integrator and the drift memory circuit is sufficient during the time $t_1$, an error of integration caused by drift which continues also after the time $t_1$ can be completely eliminated. Moreover, since a d-c amplifier having an extremely small drift is not an essential means, the integrating network of this invention can be formed at low cost.

In the above-mentioned embodiments, if an active circuit is connected at the preceding stage of the integrating network, the apparent voltage of a d-c power source of the preceding active circuit is equivalent to the sum of the voltage (+B) of the d-c power source and the converted drift voltage (−Vd) in the feedback signal. Accordingly, a separate d-c power source is necessary.

Figure 4:
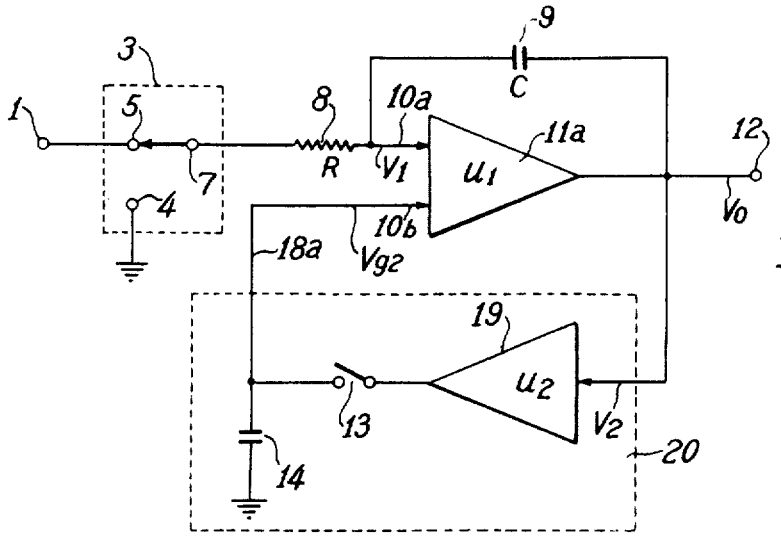
FIGS. 4, 5, 6 and 7 are block diagrams each illustrating an embodiment of this invention.

With reference to FIG. 4, an embodiment of this invention which does not require a separate d-c power source of the preceding stage even if an active network is connected to the preceding state will be described. In this embodiment, a differential amplifier 11a having two [inputs] *input terminals* 10a and 10b is employed in place of the d-c amplifier 11 having the single input 10 in the embodiments shown in FIGS. 2 and 3. Moreover, a d-c amplifier 19 having a single input is employed in place of the source follower of the embodiments shown in FIGS. 2 and 3. The differential amplifier 11a has [a sufficient] *an* amplification factor $u_1$, and the polarity of the input *terminal* 10a is reverse to the polarity of the output *terminal 12* of the amplifier 11a [while the]. *The* polarity of the input *terminal* 10b is the same as the polarity of the output *terminal* of the amplifier 11a. The d-c amplifier 19 has an amplification factor $u_2$, and the polarity of the input *terminal* of this amplifier 19 is reverse to the polarity of the output *terminal* thereof. The d-c amplifier 19, a switch 13 and a capacitor 14 form a drift memory circuit 20 *which feeds back the output signal of the differential amplifier 11a to the other input terminal 10b thereof in the same polarity as that of the input terminal 10a* as mentioned above. A converted drift voltage *as* mentioned below is applied to the input 10b through a connection line 18a from the drift member circuit 20. The terminal 4 of the switch 3 is grounded, while other parts are the same as the parts of the embodiments shown in FIGS. 2 and 3.

In operation, the common terminal 7 of the switch 3 is connected to the terminal 4 while the switch 13 is switched-on. In this case, if it is assumed that respective drift voltages of the amplifiers 11a and 19 converted in terms of the respective inputs are a value $V_1$ (at the input *terminal* 10a) and a value $V_2$, the output voltage $V_o$ of the output terminal 12 is as follows:

$$V_o = -\frac{u_1}{1+u_1u_2}(V_2u_2 - V_1). \quad (2)$$

If a condition $u_1 u_2 >> 1$ is applied to the Equation (2), the following result is obtained.

$$V_o = -V_2 + V_1/u_2 \quad (3)$$

Therefore, a voltage $V_{g2}$ of the input *terminal* 10b becomes equal to the converted voltage $V_1$ so that no current flows in the resistor 8. *In this case, a quiescent condition is established.*

Thereafter, when the switch 13 is switched-off while the common terminal 7 of the switch 3 is connected to the terminal 5, an input voltage applied across the terminal 1 and the ground is integrated by an integrator formed by the integrating resister 8, the differential amplifier 11a and the integrating capacitor 9. In this case, since the voltage $V_{g2}$ of the input *terminal* 10b is still maintained at the voltage $V_1$, the drift of the differential amplifier 11a can be effectively compensated. Accordingly, the integration of the input voltage can be performed without error caused by "drift" in the integrator. In the above operation, if the drift voltages $V_1$ and $V_2$ are not varied, the gradient of the integrated output voltage $V_o$ is irrespective of the drift voltages $V_1$ and $V_2$ so that "drift" is completely eliminated from this integrating network. In this case, if an input voltage $V_i$ is applied across the input terminal 1 and the ground, an output voltage $V_o$ having the gradient $-V_i/RC$ can be obtained at the output terminal 12.

Figure 5:
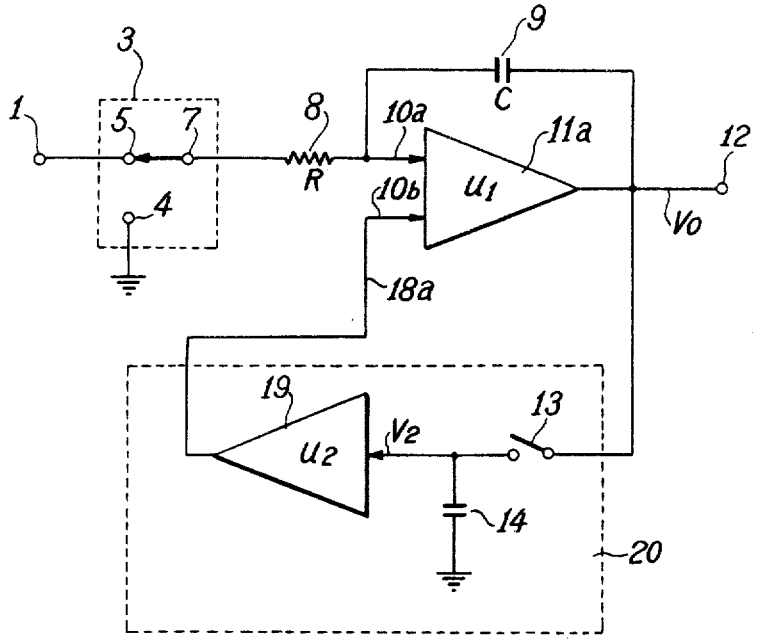

In the drift memory circuit 20 of the embodiment shown in FIG. 4, the switch 13 and the capacitor 14 may be provided before the d-c amplifier 19 as shown in FIG. 5. In this case, the charged voltage of the capacitor 14 is amplified at the d-c amplifier 19 and applied to the input *terminal* 10b of the differential amplifier 11a through the connection line 18a. Other parts are the same as the parts of the embodiment shown in FIG. 4. In this embodiment, the d-c amplifier 19 has to have a high impedance sufficient for avoiding a short-time discharge of the charged voltage of the capacitor 14. If the amplification factor $u_2$ of the d-c amplifier 19 is sufficiently large, the above-mentioned Equation (3) is converted as follows:

$$V_o = -V_2 \quad (4)$$

Therefore, the drift voltages in the amplifiers 11a and 19 are effectively eliminated.

Figure 6:
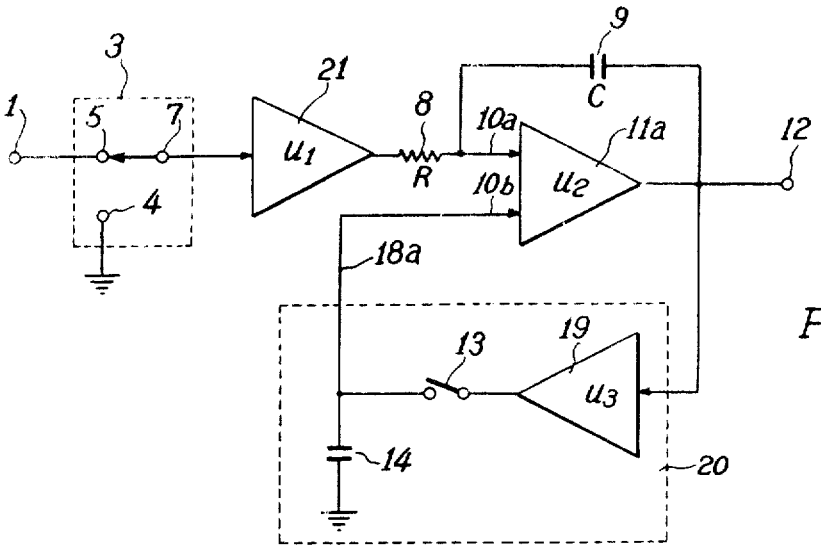

With reference to FIG. 6, a modification of the embodiment shown in FIG. 4 will be described. In this embodiment, a d-c amplifier 21 having an amplification factor $u_1$ is provided between the switch 3 and the integrating resistance 8. Other parts are the same as the parts of the embodiment shown in FIG. 4.

In operation, the common terminal 7 of the switch 3 is connected to the terminal 4 while the switch 13 is switched-on. In this case, if it is assumed that respective drift voltages of the amplifiers 21, 11a and 19 converted in terms of the respective [inputs] *input terminals* are a value $V_1$, a value $V_2$ (at the input terminal 10a) and a value $V_3$, the output voltages $V_o$ of the output terminal 12 is as follows:

$$V_o = u_2/(1 + u_2 u_3)(u_1V_1 - u_3V_3 + V_2) \quad (5)$$

If a condition $u_1u_2 >> 1$ is applied to the Equation (5), the following result is obtained.

$$V_o = -V_3 + u_1/u_3 V_1 + V_2/u_3 \quad (6)$$

In this case, if it is assumed that the voltage of the input *terminal* 10a is a value $V_{g1}$, the voltage of the input *terminal* 10b can be indicated as follows:

$$V_{g2} = u_2/(1 + u_2u_3)(u_2V_{g1} + V_3) \quad (7)$$

If conditions $u_2u_3 >> 1$ and $u_2 >> 1$ are applied to the Equation (7), the following result is obtained.

$$V_{g2} = V_{g1} = V_1u_1 + V_2 \quad (8)$$

Therefore, no current flows in the resistor 8.

Thereafter, when the switch 13 is switched-off while the common terminal 7 of the switch 3 is connected to the terminal 5, an input voltage applied across the terminal 1 and the ground is integrated by an integrator formed by the d-c amplifier 21, the integrating resistor 8, the differential amplifier 11a and the integrating capacitor 9. In this case, since the voltage $V_{g2}$ of the input *terminal* 10b is still maintained at a voltage $V_d$ equal to a voltage $(V_1u_1 + V_2)$, the drift voltages of the differential amplifier 11a and the d-c amplifier 21 can be effectively compensated. Accordingly, the integration of the input voltage can be performed without error caused by "drift" in the integrator. In the above operation, if the drift voltages $V_1$, $V_2$ and $V_3$ are not varied, the gradient of the integrated output voltage $V_o$ is irrespective of the drift voltages $V_1$, $V_2$ and $V_3$ so that "drift" is completely eliminated from this integrating network. In this case, if an input voltage $V_i$ is applied across the input terminal 1 and the ground, an output voltage $V_o$ having the gradient $-V_i/RC$ can be obtained.

Figure 7:
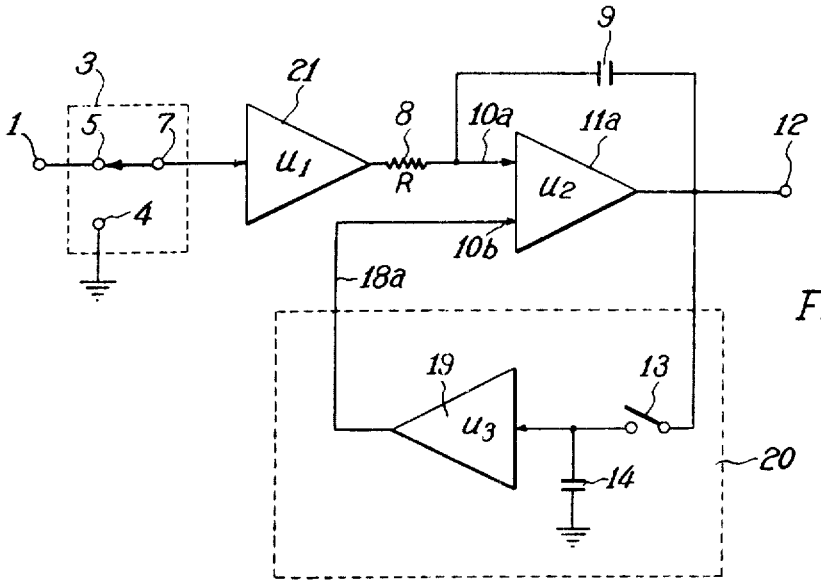

In the drift memory circuit 20 of the embodiment shown in FIG. 6, the switch 13 and the capacitor 14 may be provided before the d-c amplifier 19 as shown in FIG. 7. In this case, the charged voltage of the capacitor 14 is amplified at the d-c amplifier 19 and applied to the input *terminal* 10b of the differential amplifier 11a through the connection line 18a. Other parts are the same as the parts of the embodiment shown in FIG. 6. In this embodiment, the d-c amplifier 19 has to have a high impedance sufficient for avoiding a short-time discharge of the charged voltage of the capacitor 14. If the amplification factor $u_3$ of the amplifier 19 is sufficiently larger than one and also sufficiently larger than the amplification factor $u_1$ of the amplifier 21, the above Equation (6) is converted as follows:

$$V_o = -V_3 \quad (9)$$

Therefore, the drift voltages in the amplifiers 21, 11a and 19 are effectively eliminated.

Figure 8:
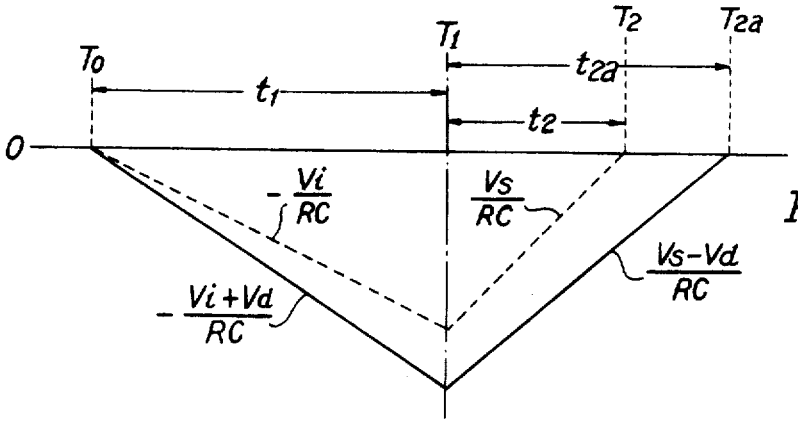
FIG. 8 is a waveform diagram explanatory of the effect of drift in a d-c amplifier used in an analogue-digital converter using an integrating network of this invention.

Each one of the above-mentioned integrating networks of this invention can be applied to form an analogue-digital converter in which an input signal is integrated to detect the level of the input signal. A detailed discussion of the analogue-digital converter will follow after a description of how an error is caused by the drift in the integrator, described in view of the principle of the analogue-digital converter with reference to FIG. 8.

If it is assumed that the voltage of an input signal, a reference voltage and the time constant of the integrator are respectively values $V_i$, $V_s$ and RC, an output wave form $V_o$ having the gradient $(-V_i/RC)$ is obtained at the output of the integrator in response to the voltage $V_i$ of the input signal if the d-c amplifier employed in the integrator has no drift. In this case, if the input of the integrator is switched to the reference voltage $-V_s$ at a time $T_1$ delayed by a time $t_1$ after a time $T_o$ when the output wave form $V_o$ exceeds a predetermined reference level (e.g.; zero level Lo), the gradient of the output wave form $V_o$ varies to a value $V_s/RC$ so that the output waveform $V_o$ reaches the zero level Lo at a time $T_2$ delayed by a time $t_2$ from the time $T_1$. In this case, the following result is obtained.

$$t_2/t_1 = V_i/V_s \quad (10)$$

Accordingly, the voltage $V_i$ of the input signal can be obtained from the values $t_2/t_1$ and $V_s$. This is the general principle of an analog-digital converter.

However, if the d-c amplifier drifts, the output waveform Vo would reach a value $(-Vd.t_1/RC)$ at a time $T_1$ even if the voltage $V_i$ of the input signal is zero; where the value "Vd" is a value of drift converted in terms of the input of the integrator. Accordingly, if the input voltage $V_i$ of the input signal is applied to the integrator having the drift Vd, the output wave form Vo has the gradient $-(V_i + Vd)/RC$. Therefore, if the input of the integrator is changed to the reference voltage $V_s$ at the time $T_1$ delayed by the time $t_1$ from the time $T_o$ when the output waveform Vo exceeds the zero level Lo. The following error $(t_{2a} - t_2)$ results from the drift Vd.

$$t_{2a} - t_2 = \frac{Vd(V_s \pm V_i)}{V_s(V_s \pm Vd)} t_1. \quad (11)$$

Figure 9:
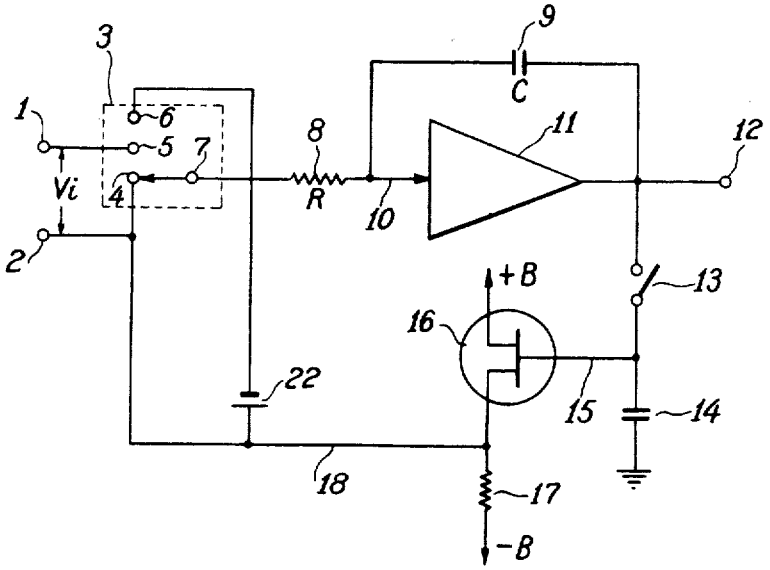
FIGS. 9, 11 and 14 are block diagrams each illustrating an example of the invention suitable to form an analogue-digital converter.

FIG. 9 shows main parts of the analogue-digital converter using the integrating network of this invention to perform the above-mentioned principle without "drift error." In this example, a terminal 6 is further provided at the switch 3 while a separated d-c source 22 is connected across the line 18 and the terminal 6. Other parts are the same as the integrating network shown in FIG. 2.

In operation, a linear wave form having the gradient $-V_i/RC$ is obtained at the output terminal 12 as an output voltage $V_o$, in a manner similar to the operation of the integrating network shown in FIG. 2. At a time $T_1$ delayed by a time $t_1$ from the time $T_o$ when the linear wave form exceeds a predetermined reference level (e.g.; zero level Lo), the terminal 6 and the terminal 7 are connected to each other at the switch 3 while the switch 13 is maintained at the switched-off condition. Since the polarity of the reference voltage $V_s$ is reverse to the polarity of the input voltage $V_i$, a current i, which is obtained by dividing, by the resistance R of the resistor 8, the sum of the potential to the ground $-Vd$ of the line 18, the reference voltage $V_s$ of the reference d-c source 22 and the value of the drift Vd converted in terms of the input terminal of the integrator flows in the resistor 8. Namely:

$$[i_1 = (-Vd + V_s = Vd)/R = -V_s/R \quad (12)]$$

$$i_1 = (-Vd + Vs + Vd)/R = -Vs/R \quad (12)$$

Accordingly, a linear wave form having the gradient $V_s/RC$ is obtained at the output terminal 12. At a time $T_2$ delayed by a time $t_2$ from the time $T_1$, the output voltage $V_o$ reaches the zero level Lo. In this case, the relationship shown in the Equation (10) is obtained. After the time $T_2$, the switch 13 is switched-off while the terminal 4 and the terminal 7 are connected to each other at the switch 3 so that the above-mentioned stationary condition is obtained. Thereafter, these operations are repeated.

As understood from the above explanation, the relationship shown in the Equation (10) can be obtained without error caused by "drift" even if the integrator has "drift."

Figure 10:
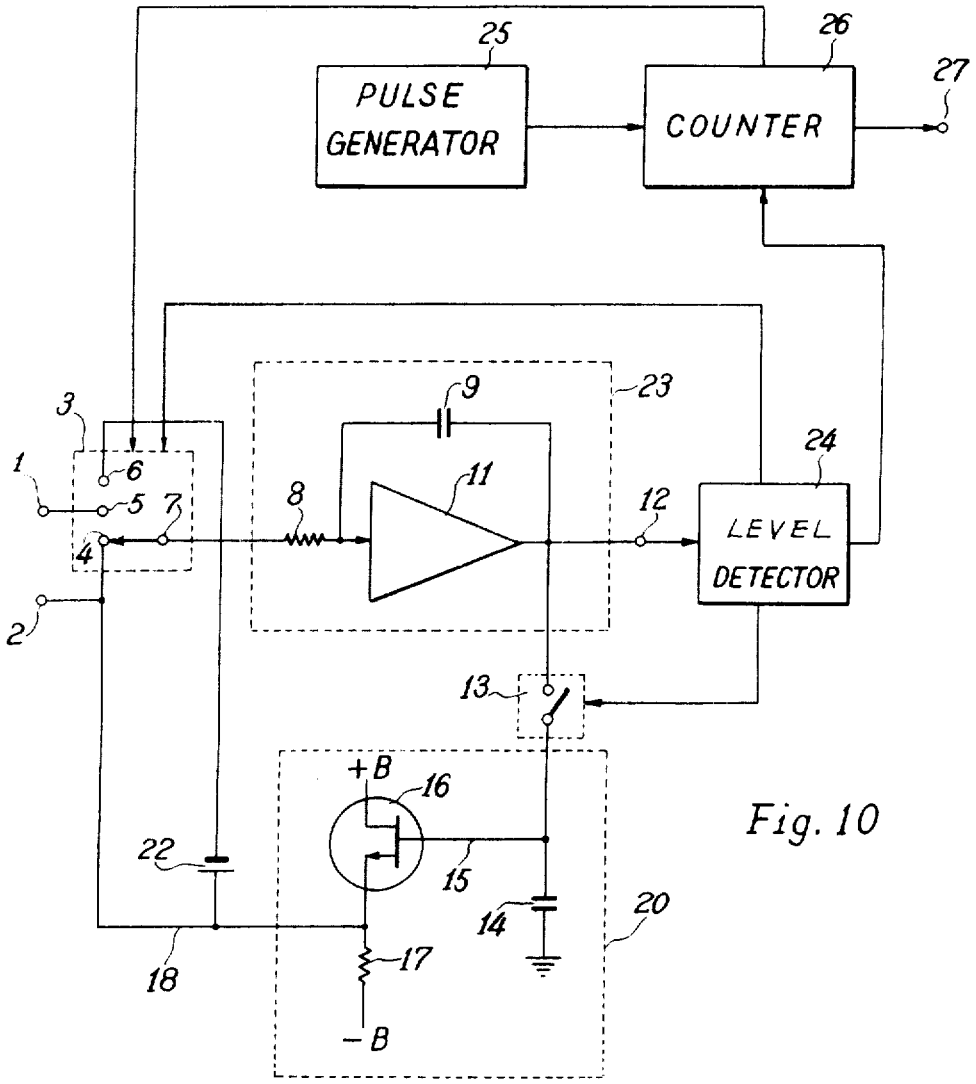
FIGS. 10, 13 and 16 are block diagrams each illustrating an analogue-digital converter using an integrating network of this invention.

With reference to FIG. 10, an example of the analogue-digital converter provided with means for measuring the value $t_2/t_1$ shown in the Equation (10) comprises input terminals 1 and 2, a switch 3, an integrator 23, a switch 13, a drift member circuit 20, a reference d-c source 22, a zero-level detector 24 generating control pulses when the output voltage of the integrator 23 reaches a reference level (e.g.; zero level), a pulse generator 25 generating pulses at regular intervals, a counter 26 counting the number of the pulses applied from the pulse generator 25, and an output terminal 27.

In operation, if the drift voltage of the integrator 23 converted in terms of the input thereof is a value Vd when the switch 13 is switched-on while the terminal 4 is connected to the terminal 7, the output of the drift memory circuit 20 is maintained at a stationary value $-Vd$. After an appropriate time in which the above stationary condition continues, the switch 13 is switched-off while the terminal 5 is connected to the terminal 7 at the switch 3. Since the input voltage $V_i$ is applied across the terminals 1 and 2 and the potential to ground $-Vd$ is applied to the terminal 2 from the drift member circuit 20, the potential to ground of the input (e.g.; terminal 7) of the integrator 23 becomes a value $V_i - V_d$. On the other hand, the drift voltage $V_d$ of the integrator 23 converted in terms of the input thereof is a value $V_d$. Accordingly, the output voltage $V_o$ of the integrator 23 obtained at the terminal 12 has the following gradient:

$$-\frac{V_i - V_d + V_d}{RC} = \frac{-V_i}{RC} \quad (13)$$

This output voltage $V_o$ is applied to the zero level detector 24, so that a first reset pulse is applied from the zero level detector 24 to the counter 26 at a time $T_o$ when the output voltage $V_o$ reaches the zero level Lo. In response to the first reset pulse, the counting state of the counter 26 is reset to a first counting state corresponding to a first number. Thereafter, the counter 26 counts the number of pulses from the pulse generator 25. When the counting state of the counter 26 reaches a second counting state corresponding to a second number, the counter 26 generates a second reset pulse which is applied to the switch 3 so as to switch the terminal 7 to the terminal 6. At the same time, the counter 26 is reset to zero. The second reset pulse is generated at the time $T_1$ delayed by the time $t_1$ from the time $T_o$. After the time $T_1$, the voltage $V_s$ is applied across the line 18 and the terminal 7 so as to be reverse to the polarity of the input voltage $V_i$, the output voltage $V_o$ at the terminal 12 has the following gradient:

$$-\frac{-V_s - V_d + V_d}{RC} = \frac{V_s}{RC} \quad (14)$$

At the time $T_2$ delayed by the time $t_2$ from the $T_1$, the output voltage $V_o$ of the integrator 23 reaches the zero level Lo so that the zero level detector 24 generates a control signal. This control signal is applied to the switch 3 to switch the terminal 7 to the terminal 4 and to the switch 13 to switch it "on." The number of pulses counted in the counter 26 during the time $t_2$ is proportional to the input voltage $V_i$. This counting result is obtained at the output terminal 27. In response to the switching of the switches 3 and 13, the drift memory circuit 20 starts to detect and store the drift voltage Vd of the integrator 23, and the above-mentioned operations are repeated.

Another embodiment of the integrating [networks] *network* of this invention to be employed for providing an analogue-digital converter is described with reference to FIG. 11. In this embodiment, a d-c amplifier 11b is further provided at the output of the integrator (8, 9 and 11a). The output terminal 12 is provided at the output *terminal* of the d-c amplifier 11b, and the input of the drift memory circuit 20 is connected to the output *terminal* of the d-c amplifier 11b. Moreover, a grounded terminal 6 is provided at the switch 3 and a reference voltage source 22 is connected across the terminal 4 of the switch 3 and ground. Other parts are the same as the parts of the embodiment shown in FIG. 4.

In operation, the common terminal 7 of the switch 3 is connected to the terminal 6 while the switch 13 is switched-on. In this case, if it is assumed that the respective drift voltages of the d-c amplifiers 11a, 11b and 19 converted in terms of the respective [inputs] *input terminals* are values $V_1$, $V_2$ and $V_3$, the output voltage $V_o$ of the output terminal 12 is as follows:

$$V_o = -u_2/(1 + u_1u_2u_3)\,(u_1u_3V_3 - u_1V_1 + V_2) \qquad (15)$$

where references $u_1$, $u_2$ and $u_3$ are respective amplification factors of the amplifiers 11a, 11b and 19. If a condition $u_1u_2u_3 >> 1$ is applied to the Equation (15), the following result is obtained.

$$V_o = -V_3 + (V_1/u_3) - (V_2/u_1u_3) \qquad (16)$$

Therefore, a voltage $V_{o3}$ of the input *terminal* of the amplifier 11b is indicated as follows:

$$V_{i2} = -u_1V_1 + u_1u_2V_3 - \frac{u_1u_2u_3}{1 + u_1u_2u_3}(u_1u_3V_3 - u_1V_1 + V_2). \qquad (17)$$

If a condition $u_1u_2u_3 >> 1$ is applied to the Equation (17), the following result is obtained.

$$V_{o3} = -V_2 \qquad (18)$$

Moreover, a voltage $V_{g2}$ of the input *terminal* 10b of the amplifier 11a is indicated as follows:

$$V_{g2} = V_3u_3 - \frac{u_2u_3}{1 + u_1u_2u_3}(u_1u_3V_3 - u_1V_1 + V_2). \qquad (19)$$

If a condition $u_1u_2u_3 >> 1$ is applied to the Equation (19), the following result is obtained.

$$V_{o2} = v_1 - (V_2/u_2) \qquad (20)$$

Since the amplification factor $u_1$ is sufficiently larger than one, the following Equation (21) is substantially satisfied.

$$V_{o2} = V_1 \qquad (21)$$

Accordingly, no current flows in the resister 8. *In this case, a quiescent condition is established.* Thereafter, the switch 13 is switched-off and the terminal 7 of the switch 3 is switched to the terminal 5 to integrate, in the integrator (8, 9 and 11a), the input voltage $V_i$ applied across the terminal 5 and the ground. In this case, the integrator performs the integration of the input voltage $V_i$ without error caused by the drift of the amplifier 11a as understood from the Equation (20). Moreover, the integrated result is obtained at the output terminal after amplification by the amplifier 11b without error caused by the drift of the amplifier 11b as understood from the Equation (18).

Figure 11:
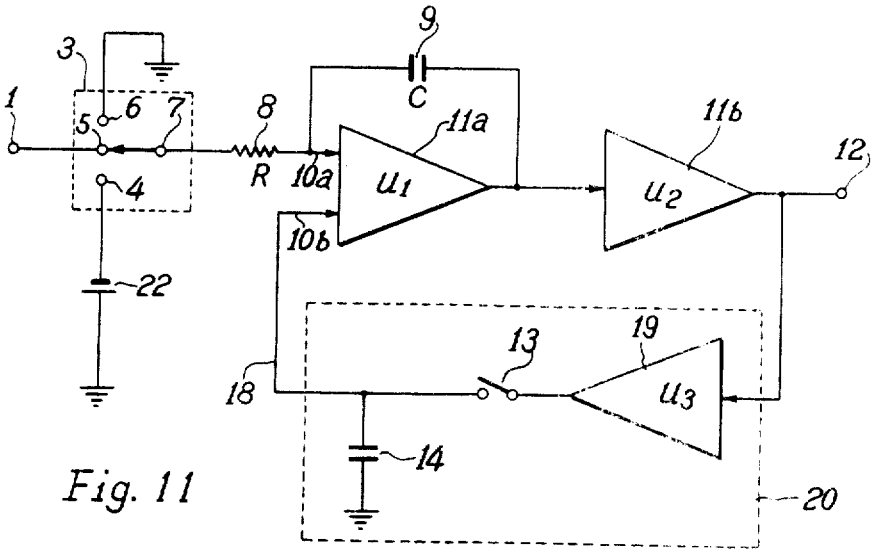
Figure 12:
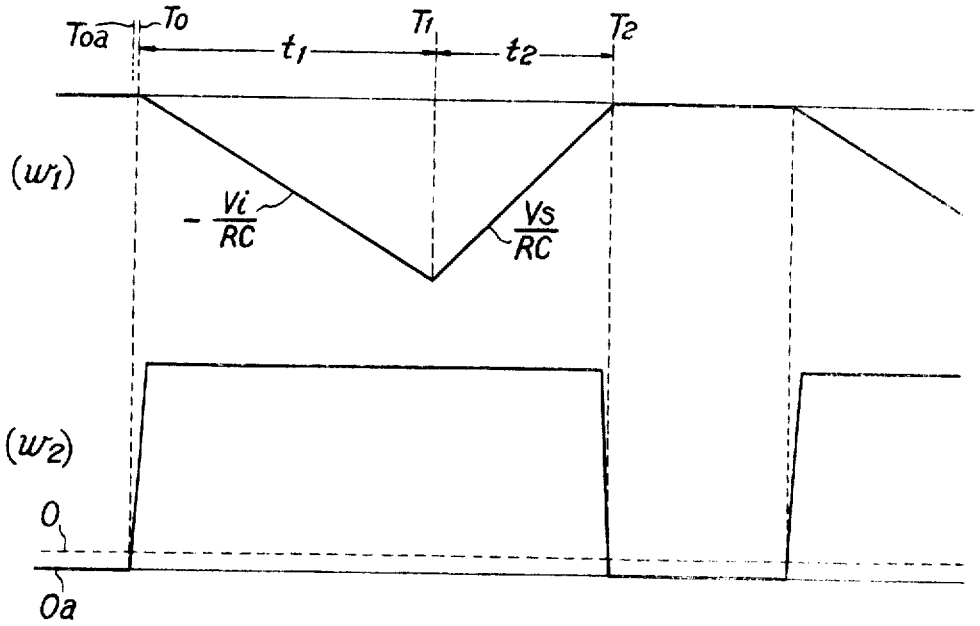
FIGS. 12 and 15 are time charts explanatory of operations of the examples shown in FIGS. 11 and 14.
Figure 13:
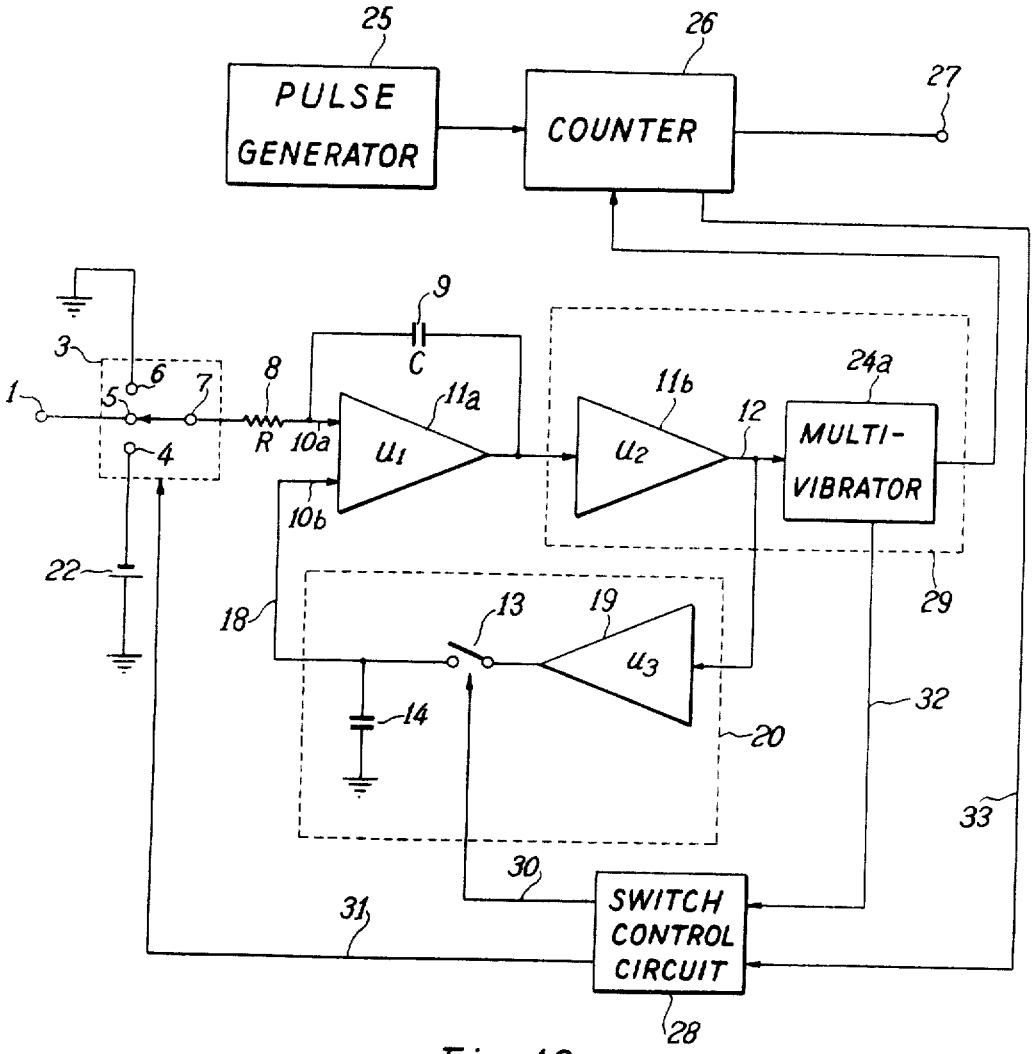

With reference to FIGS. 12 and 13, an example of the analogue-digital converter using the integrating network shown in FIG. 11 will be described. In addition to parts shown in FIG. 11, this example further comprises a multivibrator 24a reversing the state thereof when the output $w_2$ of the amplifier 11b intersects with a reference level O, and a switching control circuit 28 for controlling the switches 3 and 13 in response to control signals from the multivibrator 24a and the counter 26. The pulse generator 25 and the counter 26 are the same as the circuits 25 and 26 of the example shown in FIG. 10. The d-c amplifier 11b and the multivibrator 24a form a zero-level detector 29.

In operation, a stationary condition is obtained in a condition where the switch 13 is switched-on and the common terminal 7 of the switch 3 is connected to the grounded terminal 6. At a time $T_{oa}$, the switch 13 is switched-off while terminal 7 is switched to the terminal 5 in response to the control signal supplied from the switch control circuit 28. Accordingly, a waveform $w_2$ is obtained at the output *terminal* of the amplifier 11b in response to the input signal $V_i$ applied across the input terminal 1 and the ground. At a time $T_o$ when the instantaneous level of the waveform $w_2$ exceeds the zero-level O, the state of the multivibrator 24a is reversed. In response to the change of state of the multivibrator 24a, the counter 26 starts to count the number of pulses from the pulse generator 25. At a time $T_1$ delayed by a time $t_1$ from the time $T_o$, the counter 26 counts over n pulses so that the counter [26a] *26* is reset and generates a control signal which is applied through a line 33 to the switch control circuit 28. In response to the control signal from the counter 26, the switch control circuit 28 generates a control signal which is applied through a line 31 to the switch 3 so as to connect the terminal 7 to the terminal 4. Accordingly, the instantaneous level of the output *signal* of the amplifier 11b is reduced and again intersects with the zero-level O at a time $T_2$ delayed by a time $t_2$ from the time $T_1$. At the same time $T_2$, the state of the multivibrator 24a is restored so that the counter 26 starts to count the number of pulses from the pulse generator 25 while the switch control circuit 28 switches off the switch 13 and switches the terminal 7 of the switch 3 to the terminal 6 to obtain the stationary condition. The counter 26 counts over m pulses during the time $t_2$ and generates a digital output representative of the m pulses. After an appropriate time from the time $T_2$, the switch control circuit 28 generates a control signal to switch-on the switch 13 and to switch the terminal 7 of the switch 3 to the terminal 5. Accordingly, the output wave form $w_2$ is obtained at the output terminal 12 of the amplifier 11b. *As seen from the waveforms $w_1$ and $w_2$ in FIG. 12, the amplifier 11b has a sufficiently high gain so that the amplifier 11b is saturated at a low level of the output signal $w_1$ of the integrator.* The above-mentioned operations are repeated.

In accordance with the above-operations, the following result is obtained.

$$t_2t_1 = m/n \qquad (22)$$

By way of example, if it is assumed that the time $t_1$ is a time in which one thousand pulses are generated from the pulse generator, that the reference voltage $V_x$ of the reference d-c source 22 is 1 volt and that the counter 26 counts 542 pulses in the time $t_2$, the value $V_i$ of the input signal is 0.542 volts.

If the input signal $V_i$ has minus polarity, the polarity of the reference d-c voltage source 22 is also reversed so that plus terminal of the source 22 is connected to the terminal 4. The polarity of the output *terminal* of the d-c amplifier 11b may have the [ same ] *reverse* polarity [as] *to* the input *terminal* of the amplifier 11b. In this case, the [ phase ] *polarity* relationship between the input and output *terminals* of the d-c amplifier [20] *19* is [ also reversed ] *the same polarity*. In the drift memory circuit 20, the d-c amplifier 19 may be inserted in the line 18 so that the switch 13 is connected to the terminal 12 and the output *terminal* of the d-c amplifier 19 is connected to the input *terminal* 10b of the amplifier 11 through the line 18.

Figure 14:
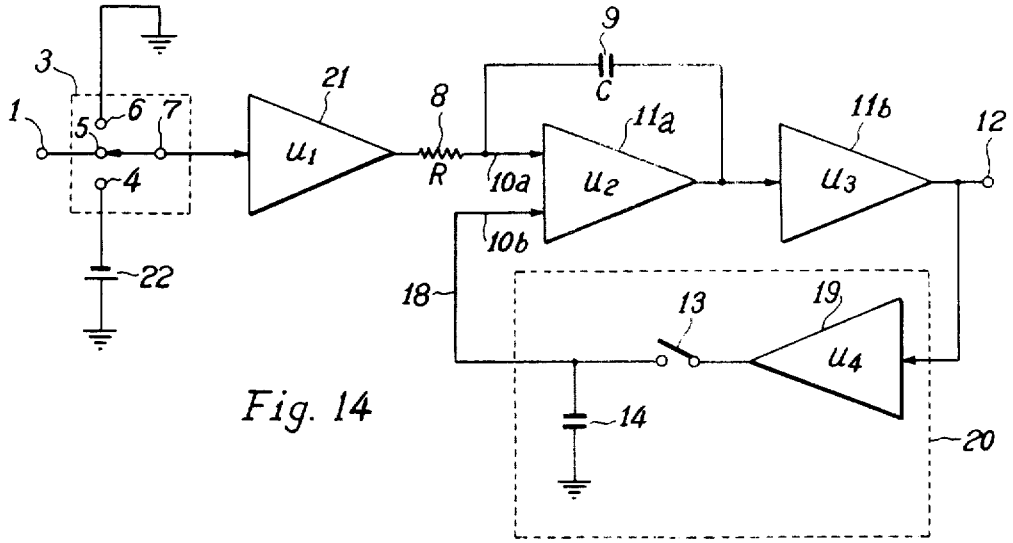
Figure 15:
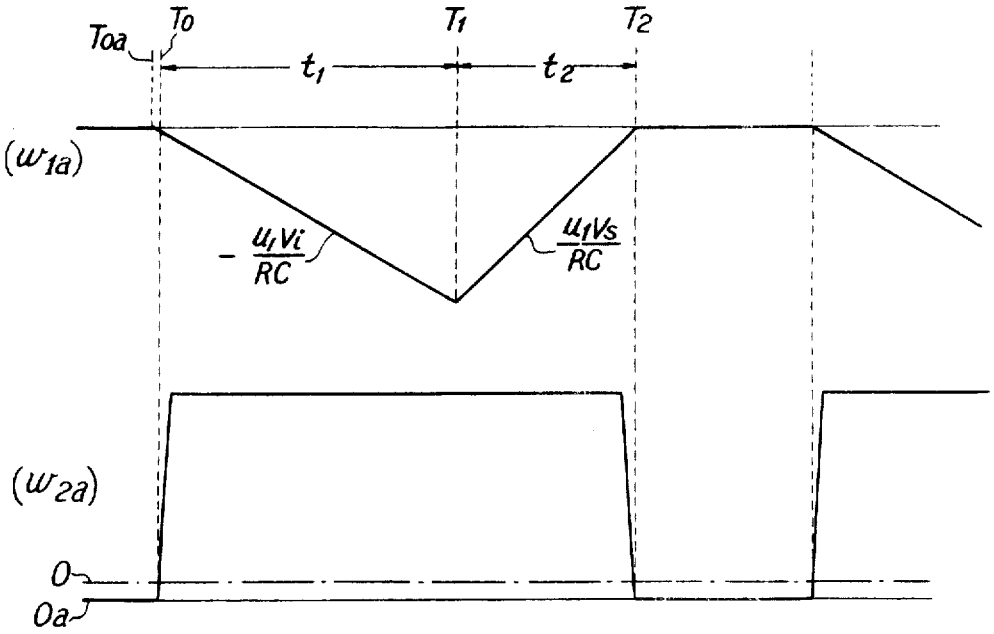

The embodiment shown in FIG. 11 can be modified as shown in FIG. 14 in which a d-c amplifier 21 is further provided between the common terminal 7 and the integrating resistor 8. Other parts are the same as the embodiment shown in FIG. 11. *A time chart explanatory of the operation of the example in FIG. 14 is shown in FIG. 15.*

In operation, the common terminal 7 of the switch 3 is connected to the terminal 6 while the switch 13 is switched-on. In this case, if it is assumed that the respective drift voltages of the d-c amplifiers 21, 11a, 11b and 19 converted in terms of the respective [ inputs ] *input terminals* are values $V_1$, $V_2$, $V_3$ and $V_4$, the output $V_o$ of the output terminal 12 is as follows:

$$V_o = -u_3/(1 + u_2u_3u_4)(u_2u_4V_4 - u_1u_2V_1 - u_2V_2 + V_3) \qquad (23)$$

where references $u_1$, $u_2$, $u_3$ and $u_4$ are respective amplification factors of the amplifiers 21, 11a, 11b and 19. If a condition $u_2u_3u_4 >> 1$ is applied to the Equation (23), the following result is obtained.

$$V_o = V_4 + (u_1/u_4)V_1 + (V_2/u_4) - (V_3/u_2u_4) \qquad (24)$$

Therefore, a voltage $V_{g2}$ of the input terminal 10b of the amplifier 11b is indicated as follows:

$$V_{g2} = (V_o + V_4)u_4$$

$$= \frac{-u_3u_4}{1 + u_2u_3u_4}(u_2u_4V_4 - u_1u_2V_1 - u_2V_2 + V_3) + u_4V_4. \qquad (25)$$

If a condition $u_2u_3u_4 >> 1$ and a condition $u_2 >> 1$ are applied to the Equation (25), the following result is obtained.

$$V_{g2} = u_1V_1 + V_2 \qquad (26)$$

Accordingly, no current flows in the integrating resistor 8. Moreover, a voltage $V_{g3}$ of the input *terminal* of the d-c amplifier 11b is indicated as follows:

$$[V_{g3} = (V_ou_3 + V_4u_4 - V_1u_1 + V_2)\,u_2 \qquad (27)]$$

$$V_{g3} = (V_ou_4 + V_4u_4 - V_1u_1 + V_2)\,u_2 \qquad (27)$$

If a condition $u_2u_3u_4 >> 1$ is applied to the Equation (27), the following result is obtained.

$$V_{g3} = -V_3 \ldots \qquad (28)$$

As understood from the above equation, drift voltages of the d-c amplifiers 21, 11a and 11b can be effectively eliminated in the embodiment shown in FIG. 14. In other words, drift voltages of the preceding amplifier 21 and the succeeding amplifier 11b can be eliminated in addition to the drift voltage of the integrator (8, 9 and 11a).

Figure 16:
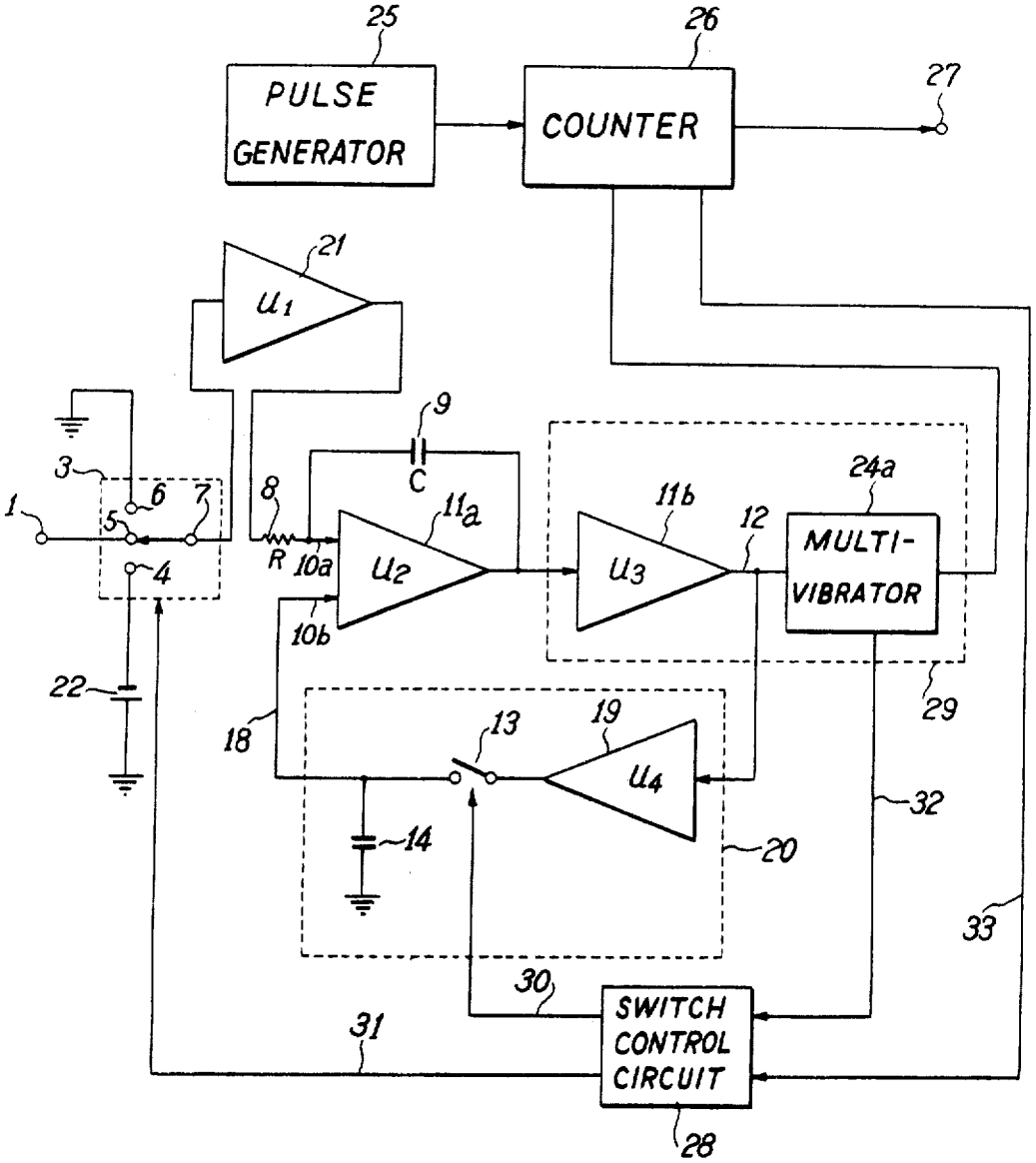

The embodiment shown in FIG. 14 can be applied to form an analogue-digital converter as shown in FIG. 16. The operation of the analogue-digital converter shown in FIG. 16 can be understood in view of the operation of the analogue-digital converter shown in FIG. 13. Therefore, details are omitted while waveforms $w_{1a}$ and $w_{2a}$ are respective outputs of the amplifiers 11a and 11b. *As seen from the waveforms $w_{1a}$ and $w_{2a}$ in FIG. 15, the amplifier 11b has a sufficiently high gain so that the amplifier 11b is saturated at a low level of the output signal $w_{1a}$ of the integrator.*

What I claim is:

1. An integrating network comprising:

an integrator having an output and having an input for receiving an input voltage signal, and being formed by a first d-c amplifier and time-constant means connected to said first d-c amplifier, drift memory circuit means connected between the output and input of the integrator for feeding back [ in the opposite polarity ] the output of the first d-c amplifier to [ the ] *an* input of the integrator in the absence of an input voltage at an input of the first d-c amplifier so as to obtain a stationary condition and for continuously sending out, as a feedback signal, a voltage fed back to the input of the integrator at the stationary condition, the feedback signal having a value substantially equal to the drift voltage of the first d-c amplifier converted in terms of the input of the integrator, whereby an input voltage signal is integrated in the integrator without error caused by the drift of the first d-c amplifier, level detector means connected to the output of the integrator to produce a first control pulse when the output of the integrator exceeds a predetermined reference level and to produce a second control pulse when the output of the integrator crosses the predetermined reference level in the decreasing direction, a time measuring means coupled to the level detector for generating a third control pulse in response to the termination of a predetermined first time period measured from the first control pulse and for measuring a second time period between the third control pulse and the second control pulse, a reference d-c source, and input switch means connected to said reference d-c source and to the input of the integrator for applying the input voltage signal to the integrator in response to the first control pulse, for applying a reference d-c voltage from the d-c source to the integrator in response to the third control pulse, and for shortening the input of the integrator in response to the second control pulse, whereby the level of the input voltage signal can be determined by the ratio of the second time period to the first time period, multiplied by the value of the reference voltage from the reference d-c source.

2. An integrating network according to claim 1, in which the drift memory circuit means comprises a second d-c amplifier, a switch connected to the output of the second d-c amplifier, means for actuating said switch to a closed state in the absence of said input voltage at the input of the first d-c amplifier and for actuating said switch to an open state upon application of the input voltage to the first d-c amplifier, and a capacitor connected in series between the switch and ground.

3. An integrating network according to claim 1, in which the drift memory circuit means comprises a switch, and means for actuating said switch to a switched-on state in the absence of said input voltage at the first d-c amplifier, and to a switched-off state at the application of the input voltage to the d-c first amplifier, a capacitor connected between the switch and ground, and a second d-c amplifier connected to the junction between the switch and the capacitor.

4. An integrating network according to claim 1, in which the first d-c amplifier is a differential amplifier having a first input terminal receiving the input voltage signal to be integrated and a second input terminal receiving the feedback signal.

5. An integrating network, comprising:

an integrator having an input and an output, and being formed by a first d-c amplifier and time-constant means connected to said first d-c amplifier, a second d-c amplifier having an output connected to said input of the integrator, and having an input for the application of an input voltage signal thereto, drift memory circuit means connected between the output and input of the integrator for feeding back [in the opposite polarity] the output of the first d-c amplifier to [the] *an* input of the integrator in the absence of said input voltage at an input of the second d-c amplifier so as to establish a quiescent condition and for continuously sending out, as a feedback signal, a voltage fed back to the input of the integrator at the quiescent condition, the feedback signal having a value substantially equal to the drift voltages of the first and second d-c amplifiers converted in terms of the input of the integrator, whereby said input voltage signal applied through the second d-c amplifier is integrated without error caused by the drift of the first and second d-c amplifiers.

6. An integrating network according to claim 5, in which the drift memory circuit means comprises a third d-c amplifier, a switch connected to the output of the third d-c amplifier, means for actuating said switch to a closed state in the absence of said input voltage at the input of the first d-c amplifier and for actuating said switch to an open state upon application of the input voltage to the first d-c amplifier, and a capacitor connected in series between the switch and ground.

7. An integrating network according to claim 5, in which the drift memory circuit means comprises a switch, and means for actuating said switch to a switch-on state in the absence of said input voltage at the first d-c amplifier, and to a switched-off state at the application of the input voltage to the d-c first amplifier, a capacitor connected between the switch and ground, and a third d-c amplifier connected to the junction between the switch and the capacitor.

8. An integrating network according to claim 5, in which the first d-c amplifier is a differential amplifier having a first input terminal receiving the input voltage signal to be integrated and a second input terminal receiving the feedback signal.

9. An integrating network, comprising:

an integrator having an input and an output, and being formed by a first d-c amplifier and time-constant means connected to said first d-c amplifier, a second d-c amplifier having an output connected to said input of the integrator, and drift memory circuit means connected between the output and input of the integrator for feeding back [in the opposite polarity] the output of the first d-c amplifier to [the] *an* input of the integrator in the absence of an input voltage at an input of the second d-c amplifier so as to obtain a stationary condition and for continuously sending out, as a feedback signal, a voltage fed back to the input of the integrator at the stationary condition, the feedback signal having a value substantially equal to the drift voltages of the first and second d-c amplifiers converted in terms of the input of the integrator, whereby an input voltage signal applied through the second d-c amplifier is integrated without error caused by the drift of the first and second d-c amplifiers, level detector means connected to the output of the integrator to produce a first control pulse when the output of the integrator exceeds a predetermined reference level and to produce a second control pulse when the output of the integrator crosses the predetermined reference level on the decreasing direction, a time measuring means coupled to the level detector for generating a third control pulse in response to the termination of a predetermined first time period measured from the first control pulse and for measuring a second time period between the third control pulse and the second control pulse, a reference d-c source, and input switch means connected to said reference d-c source and to the input of the second d-c amplifier for applying the input voltage signal to the second d-c amplifier in response to the first control pulse, for applying a reference d-c voltage from the d-c source to the second d-c amplifier in response to the third control pulse, and for shorting the input of the second d-c amplifier in response to the second control pulse, whereby the level of the input voltage signal can be determined by the ratio of the second time period to the first time period, multiplied by the value of the reference voltage of the d-c source.

10. An integrating network, comprising:

an integrator having an input and an output, and being formed by a first d-c amplifier and time-constant means connected to said first d-c amplifier, a second d-c amplifier having an input connected to said output of the integrator, and drift memory circuit means connected between the output of the second amplifier and the input of the integrator for feeding back [in the opposite polarity] the output of the second d-c amplifier to [the] *an* input of the integrator in the absence of an input voltage at the input of the first d-c amplifier so as to obtain a stationary condition and for continuously sending out, as a feedback signal, a voltage fed back to the input of the integrator at the stationary condition, the fed back signal having a value substantially equal to the drift voltages of the first and second d-c amplifiers converted in terms of the input of the integrator, whereby an input voltage is integrated in the integrator without error caused by the drift of the first and second d-c amplifiers so as to produce an integrated output of the input voltage at the output of the second amplifier, level detector means connected to the output of the second d-c amplifier to produce a first control pulse when the output of the second d-c amplifier exceeds a predetermined reference level and to produce a second control pulse when the output of the second d-c amplifier crosses the predetermined reference level in the decreasing direction, a time measuring means coupled to the level detector for generating a third control pulse in response to the termination of a predetermined first time period measured from the first control pulse and for measuring a second time period between the third control pulse and the second control pulse, a reference d-c source, and input switch means connected to said reference d-c source and to the input of the integrator for applying the input voltage signal to the integrator in response to the first control pulse, for applying a reference d-c voltage from the d-c source to the integrator in response to the third control pulse, and for shorting the input of the integrator in response to the second control pulse, whereby the level of the input voltage signal can be determined by the ratio of the second time period to the first time period, multiplied by the value of the reference voltage from the reference d-c source.

11. An integrating network, comprising:

an integrator having an input and an output, and being formed by a first d-c amplifier and time-constant means connected to the first d-c amplifier, a second d-c amplifier having an output connected to said input of the integrator, a third d-c amplifier having an input connected to the output of the integrator, and drift memory circuit means connected between the output of the third amplifier and the input of the integrator for feeding back [in the opposite polarity] the output of the third d-c amplifier to [the] *an* input of the integrator in the absence of an input voltage at the input of the second d-c amplifier so as to obtain a stationary condition and for continuously sending out, as a feedback signal, a voltage fed back to the input of the integrator at the stationary condition, the fed back signal having a value substantially equal to the drift voltages of the first, second and third d-c amplifiers converted in terms of the input of the integrator, whereby an input voltage signal applied through the second d-c amplifier is integrated in the integrator without error caused by the drift of the first, second and third d-c amplifiers so as to produce an integrated output of the input voltage at the output of the third amplifier, level detector means connected to the output of the third d-c amplifier to produce a first control pulse when the output of the third d-c amplifier exceeds a predetermined reference level and to produce a second control pulse when the output of the third d-c amplifier crosses the predetermined reference level in the decreasing direction, a time measuring means coupled to the level detector for generating a third control pulse in response to the termination of a predetermined first time period measured from the first control pulse and for measuring a second time period between the third control pulse and the second control pulse, a reference d-c source, and input switch means connected to said reference d-c source and to the input of the second d-c amplifier for applying the input voltage signal to the second d-c amplifier in response to the first control pulse, for applying a reference d-c voltage from the d-c source to the second d-c amplifier in response to the third control pulse, and for shorting the input of the second d-c amplifier in response to the second control pulse, whereby the level of the input voltage signal can be determined by the ratio of the second time period to the first time period, multiplied by the value of the reference voltage from the reference d-c source.

12. An integrating network, comprising:

an integrator having an input and an output, and being formed by a first d-c amplifier and time-constant means connected to said first d-c amplifier, a second d-c amplifier having an input connected to said output of the integrator, and drift memory circuit means connected between the output of the second amplifier and the input of the integrator for feeding back [in the opposite polarity] the output of the second d-c amplifier to [the] *an* input of the integrator in the absence of an input voltage at the input of the first d-c amplifier so as to obtain a stationary condition and for continuously sending out, as a feedback signal, a voltage fed back to the input of the integrator at the stationary condition, the fed back signal having a value substantially equal to the drift voltages of the first and second d-c amplifiers converted in terms of the input of the integrator, whereby an input voltage is integrated in the integrator without error caused by the drift of the first and second d-c amplifiers so as to produce an integrated output of the input voltage at the output of the second amplifier.

13. An integrating network according to claim 12, in which the drift memory circuit means comprises a third d-c amplifier, a switch connected to the output of the third d-c amplifier, means for actuating said switch to a closed state in the absence of said input voltage at the input of the first d-c amplifier and for actuating said switch to an open state upon application of the input voltage to the first d-c amplifier, and a capacitor connected in series between the switch and ground.

14. An integrating network according to claim 12, in which the drift memory circuit means comprises a switch, and means for actuating said switch to a switched-on state in the absence of said input voltage at the first d-c amplifier, and to a switched-off state at the application of the input voltage to the first d-c amplifier, a capacitor connected between the switch and ground, and a third d-c amplifier connected to the junction between the switch and the capacitor.

15. An integrating network [ according to claim 12, in which the ] *comprising an integrator having an input terminal and an output terminal and being formed by a first d-c amplifier and time-constant means connected to the first d-c amplifier, said* first d-c amplifier [ is ] *being* a differential amplifier having a first input terminal receiving [ the ] *an* input voltage signal to be integrated and a second input terminal, [ receiving the feedback signal ]

*a second d-c amplifier having an input terminal connected to the output terminal of the integrator,*

*drift memory circuit means connected between an output terminal of said second d-c amplifier and the second input terminal of said differential amplifier for feeding back the output of the second d-c amplifier to said second input terminal of said differential amplifier in the absence of said input voltage signal at the input terminal of the integrator so as to establish a quiescent condition, the feedback signal having a value substantially equal to the drift voltage of the first and second d-c amplifier converted to terms of the first input terminal of said differential amplifier,*

*whereby said input voltage signal is integrated in the integrator without error caused by the drift of the first and second d-c amplifier so as to produce an integrated and amplified output of the input voltage at the output terminal of the second amplifier.*

16. An integrating network, comprising:

an integrator having an input and an output, and being formed by a first d-c amplifier and time-constant means connected to the first d-c amplifier, a second d-c amplifier having an output connected to said input of the integrator, and having an input for the application of an input voltage signal, a third d-c amplifier having an input connected to the output of the integrator, and drift memory circuit means connected between the output of the third amplifier and the input of the integrator for feeding back [ in the opposite polarity ] the output of the third d-c amplifier to [ the ] *an* input of the integrator in the absence of said input voltage at the input of the second d-c amplifier so as to establish a quienscent condition and for continuously sending out, as a feedback signal, a voltage fed back to the input of the integrator at the quiescent condition, the fed back signal having a value substantially equal to the drift voltages of the first, second and third d-c amplifiers converted in terms of the input of the integrator, whereby said input voltage signal applied through the second d-c amplifier is integrated in the integrator without error caused by the drift of the first, second and third d-c amplifiers so as to produce an integrated output of the input voltage at the output of the third amplifier.

17. An integrating network according to claim 16, in which the drift memory circuit means comprises a fourth d-c amplifier, a switch connected to the output of the fourth d-c amplifier, means for actuating said switch to a closed state in the absence of said input voltage at the input of the first d-c amplifier and for actuating said switch to an open state upon application of the input voltage to the first d-c amplifier, and a capacitor connected in series between the switch and ground.

18. An integrating network according to claim 16, in which the drift memory circuit means comprises a switch, and means for actuating said switch to a switched-on state in the absence of said input voltage at the first d-c amplifier, and to a switched-off state at the application of the input voltage to the d-c first amplifier, a capacitor connected between the switch and ground, and a fourth d-c amplifier connected to the junction between the switch and the capacitor.

19. An integrating network [ according to claim 16, in which the ] *comprising an integrator having an input terminal and an output terminal and being formed by a first d-c amplifier and time-constant means connected to the first d-c amplifier,*

*a second d-c amplifier having an output terminal connected to said input terminal of the integrator and an input terminal for the application of an input voltage signal, said* first d-c amplifier [ is ] *being* a differential amplifier having a first input terminal receiving the input voltage signal [ to be integrated ] *receiving, through said second d-c amplifier, said input voltage signal* and a second input terminal, [ receiving the feedback signal ]

*a third d-c amplifier having an input terminal connected to the output terminal of the integrator,*

*drift memory circuit means connected between an output terminal of said third d-c amplifier and the second input terminal of said differential amplifier for feeding back the output of the third d-c amplifier to said second input terminal of said differential amplifier in the absence of said input voltage signal at the input terminal of the second d-c amplifier so as to establish a quiescent condition and for continuously sending out, as a feedback signal, a voltage fed back to said second input terminal of said differential amplifier at the quiescent condition, the feedback signal having a value substantially equal to the drift voltage of the first, second and third amplifiers converted in terms of the first input terminal of said differential amplifier,*

*whereby said input voltage signal applied through the second d-c amplifier is integrated in the integrator without error caused by the drift of the first, second and third d-c amplifiers so as to produce an integrated and amplified output of the input voltage at the output terminal of the third amplifier.*

*20. An integrating network according to claim 15, in which said second d-c amplifier is saturable at a low level of the output of said integrator.*

*21. An integrating network according to claim 19, in which said second d-c amplifier is saturable at a low level of the output of said integrator.*

* * * * *

UNITED STATES PATENT OFFICE
CERTIFICATE OF CORRECTION

PATENT NO. : Re. 28,579

DATED : Reissued Oct. 21, 1975

INVENTOR(S) : Kozo Uchida

It is certified that error appears in the above-identified patent and that said Letters Patent are hereby corrected as shown below:

Column 11, line 20, delete "11" and insert --11a--;

Column 17, line 46, delete "fed back" and insert --feedback--;

Column 18, line 56, delete "second" and insert --third--.

Signed and Sealed this

*eighth* Day of *June 1976*

[SEAL]

*Attest:*

RUTH C. MASON
*Attesting Officer*

C. MARSHALL DANN
*Commissioner of Patents and Trademarks*